US010834007B2

(12) United States Patent
Martin et al.

(10) Patent No.: US 10,834,007 B2
(45) Date of Patent: Nov. 10, 2020

(54) ADAPTIVE PRIVATE NETWORK WITH PATH MAXIMUM TRANSMISSION UNIT (MTU) DISCOVERY PROCESS

(71) Applicant: Talari Networks Incorporated, San Jose, CA (US)

(72) Inventors: Todd Martin, Campbell, CA (US); Wei Huang, Cary, NC (US); Sonia Kiang Rovner, Chapel Hill, NC (US)

(73) Assignee: TALARI NETWORKS, INC., San Jose, CA (US)

( * ) Notice: Subject to any disclaimer, the term of this patent is extended or adjusted under 35 U.S.C. 154(b) by 162 days.

(21) Appl. No.: 16/046,680

(22) Filed: Jul. 26, 2018

(65) Prior Publication Data
US 2019/0028397 A1 Jan. 24, 2019

Related U.S. Application Data

(63) Continuation of application No. 15/385,984, filed on Dec. 21, 2016, now Pat. No. 10,050,898, which is a
(Continued)

(51) Int. Cl.
H04L 12/805 (2013.01)
G06F 11/20 (2006.01)
(Continued)

(52) U.S. Cl.
CPC ........ H04L 47/365 (2013.01); G06F 11/0709 (2013.01); G06F 11/1464 (2013.01); G06F 11/2002 (2013.01); G06F 11/2005 (2013.01); H04L 41/0659 (2013.01); H04L 41/12 (2013.01); H04L 43/10 (2013.01);
(Continued)

(58) Field of Classification Search
None
See application file for complete search history.

(56) References Cited

U.S. PATENT DOCUMENTS 5,892,753 A 4/1999 Badt et al.
5,959,974 A 9/1999 Badt et al.
(Continued)

OTHER PUBLICATIONS

Mathis et al., "Packetization Layer Path MTU Discovery," IETF RFC 4821, pp. 1-32 (Mar. 2007).
(Continued)

Primary Examiner — Gregory B Sefcheck
Assistant Examiner — Suk Jin Kang
(74) Attorney, Agent, or Firm — Jenkins, Wilson, Taylor & Hunt, P.A.

(57) ABSTRACT

Systems and techniques are described for a path maximum transmission unit (MTU) discovery method that allows the sender of IP packets to discover the MTU of packets that it is sending over a conduit to a given destination. The MTU is the largest packet that can be sent through the network along a path without requiring fragmentation. The path MTU discovery method actively probes each sending path of each conduit with fragmentation enabled to determine a current MTU and accordingly increase or decrease the conduit MTU. The path MTU discovery process is resilient to errors and supports retransmission if packets are lost in the discovery process. The path MTU discovery process is dynamically adjusted at a periodic rate to adjust to varying network conditions.

15 Claims, 14 Drawing Sheets

Related U.S. Application Data continuation of application No. 14/019,723, filed on Sep. 6, 2013, now Pat. No. 9,584,407.

(51) Int. Cl.

| | | |
|---|---|---|
| *G06F 11/14* | (2006.01) | |
| *G06F 11/07* | (2006.01) | |
| *H04L 12/24* | (2006.01) | |
| *H04L 29/08* | (2006.01) | |
| *H04L 12/751* | (2013.01) | |
| *H04L 12/721* | (2013.01) | |
| *H04L 12/26* | (2006.01) | |
| *H04L 12/841* | (2013.01) | |
| *H04L 12/801* | (2013.01) | |
| *H04L 29/06* | (2006.01) | |
| *H04W 84/12* | (2009.01) | |

(52) U.S. Cl.
CPC .............. *H04L 45/10* (2013.01); *H04L 45/26* (2013.01); *H04L 45/40* (2013.01); *H04L 47/28* (2013.01); *H04L 47/34* (2013.01); *H04L 67/12* (2013.01); *G06F 2201/86* (2013.01); *H04L 43/0858* (2013.01); *H04L 69/28* (2013.01); *H04W 84/12* (2013.01)

(56) References Cited

U.S. PATENT DOCUMENTS

| | | |
|---|---|---|
| 6,212,190 B1 | 4/2001 | Mulligan et al. |
| 7,304,959 B1 | 12/2007 | Swaroop et al. |
| 7,542,471 B2 | 6/2009 | Samuels et al. |
| 8,107,498 B2 | 1/2012 | Morimoto et al. |
| 8,687,653 B2 | 4/2014 | Bransi et al. |
| 9,584,407 B2 | 2/2017 | Martin et al. |
| 10,050,898 B2 | 8/2018 | Martin et al. |
| 2003/0188015 A1 | 1/2003 | Lee et al. |
| 2003/0185208 A1* | 10/2003 | Lee .................... H04L 45/12 370/389 |
| 2003/0187975 A1 | 10/2003 | Brown et al. |
| 2005/0005024 A1 | 1/2005 | Samuels et al. |
| 2005/0041635 A1 | 2/2005 | Chung et al. |
| 2005/0074007 A1 | 4/2005 | Samuels et al. |
| 2005/0281288 A1* | 12/2005 | Banerjee ............. H04L 47/10 370/477 |
| 2006/0045131 A1 | 3/2006 | Pancholi et al. |
| 2006/0221844 A1 | 10/2006 | Subramanian et al. |
| 2007/0171828 A1* | 7/2007 | Dalal .................. H04L 47/10 370/235 |
| 2008/0101382 A1 | 5/2008 | Bannerjee et al. |
| 2008/0298376 A1 | 12/2008 | Takeda et al. |
| 2009/0144424 A1 | 6/2009 | Takeda et al. |
| 2009/0201828 A1 | 8/2009 | Samuels et al. |
| 2009/0316574 A1 | 12/2009 | Winter et al. |
| 2010/0067397 A1 | 3/2010 | Slemens et al. |
| 2010/0103819 A1 | 4/2010 | Samuels et al. |
| 2010/0322249 A1 | 12/2010 | Thathapudi et al. |
| 2011/0243063 A1 | 10/2011 | Kuningas |
| 2011/0243138 A1* | 10/2011 | Oh .................... H04L 69/16 370/392 |
| 2012/0051236 A1 | 3/2012 | Hegde et al. |
| 2012/0281559 A1 | 11/2012 | Ner et al. |
| 2013/0322255 A1 | 12/2013 | Dillon |
| 2014/0003424 A1 | 1/2014 | Matsuhira |
| 2014/0071802 A1 | 3/2014 | Klimin et al. |

OTHER PUBLICATIONS

Postel, "Internet Control Message Protocol: Darpa Internet Program Protocol Specificiation," IETF RFC 792, pp. 1-23 (Sep. 1981).

\* cited by examiner

ADAPTIVE PRIVATE NETWORK WITH PATH MAXIMUM TRANSMISSION UNIT (MTU) DISCOVERY PROCESS

CROSS REFERENCE TO RELATED APPLICATIONS

This application is a continuation under 35 U.S.C. § 120 of U.S. patent application Ser. No. 15/385,984 filed on Dec. 21, 2016, and to be issued on Aug. 14, 2018 as U.S. Pat. No. 10,050,898 which is a continuation under 35 U.S.C. § 120 of U.S. patent application Ser. No. 14/019,723 entitled "An Adaptive Private Network with Path Maximum Transmission Unit (MTU) Discovery Process" filed Sep. 6, 2013 and issued as U.S. Pat. No. 9,584,407 on Feb. 28, 2017, the disclosures of which are hereby incorporated by reference in their respective entireties.

U.S. Pat. No. 8,125,907 filed on Jun. 11, 2009 entitled "Flow-Based Adaptive Private Network with Multiple WAN-Paths, U.S. Pat. No. 8,452,846 filed on Aug. 12, 2011 entitled "Adaptive Private Network Asynchronous Distributed Shared Memory Services", and U.S. Pat. No. 9,069,727 filed on Dec. 19, 2012 entitled "An Adaptive Private Network with Geographically Diverse Network Control Nodes" have the same assignee as the present application, are related applications, and are hereby incorporated by reference in their entireties.

FIELD OF THE INVENTION

The present invention relates generally to improved network communication. More specifically, the present invention relates to improved path maximum transmission unit (MTU) discovery systems and processes.

BACKGROUND OF THE INVENTION

The introduction of frame relay in the early 1990's brought lower cost, higher bandwidth, improved reliability, and simpler management control to enterprise wide area networks (WANs) as compared to X.25 and point-to-point leased-line alternatives. Frame relay, together with single-source asynchronous transfer mode (ATM) and multiprotocol label switching (MPLS) services, still dominate the enterprise WAN market for corporate Internet traffic. Such traditional standards tend to have fixed MTU sizes which may be changed by a network administrator. A customer installs one of these networks and pays a single carrier a fee associated with the reliability and bandwidth the particular network provides. For example, a network may be advertised to provide "3 and ½ nines" (99.95%) or better reliability and have a fee based on this reliability and a cost per megabytes per second (Mbps). The present cost for such a network is almost as high as the fee paid back in 1998.

Wi-Fi is a name for wireless local area network (WLAN) based on the IEEE 802.11 set of standards and WiMax is another wireless network based on the IEEE 802.16 set of standards. WiMax supports a much larger range and higher data rates as compared to Wi-Fi. With Wi-Fi and WiMax, the MTU size changes dynamically based on the line of sight between base stations and receivers.

Path MTU discovery allows a sender of Internet Protocol (IP) packets to discover a maximum transmission unit (MTU) of packets that it may send to a given destination. According to RFC4821 Packetization Layer Path MTU Discovery document, the maximum transmission unit (MTU) is the size in bytes of the largest IP packet, including the IP header and payload, that can be transmitted on a link or a path. A link is a communication facility or medium over which nodes can communicate at the link layer, i.e., the layer immediately below IP which is either IPv4 or IPv6. A path through the network is a set of links traversed by a packet between a source node and a destination node.

If a router tries to forward a packet to an interface whose MTU is smaller than the packet size, the router has two options. The router can fragment the packet into pieces small enough to fit within the MTU or it can drop the packet. If a don't fragment (DF) bit of the IP header is set, then the router should drop the packet rather than fragment it. Standard RFC 792 defines an Internet control message protocol (ICMP) message of type 3 (destination unreachable), code 4 (fragmentation needed and DF bit set) that can be returned to the sender of the packet to alert the host that the packet was too large to be transmitted without fragmentation.

SUMMARY OF THE INVENTION

Among its several aspects, the present invention recognizes the current method has a number of problems and provides approaches for addressing issues such as those noted below. For example, many network security devices may block all ICMP messages for security benefits. As a consequence, packets having a size greater than the current MTU for the path may be dropped without providing an indication of the packet loss. In another example, if the network changes and the MTU size increases, network node may not know about the MTU size increase and keeps using a previous small MTU size, resulting in sub-optimal performance.

The present invention recognizes that it is advantageous to have an accurate and timely MTU discovery method which will actively probe each sending path of each conduit to find out the path's current MTU and adjust accordingly. The techniques for addressing such advantages are discussed further below.

Also, among its several aspects, the present invention addresses systems and techniques which improve performance, reliability, and predictability of networks without requiring costly hardware upgrades or replacement of existing network equipment. To such ends, an embodiment of the invention addresses a method in a network node to dynamically adjust a maximum transmission unit (MTU). A path MTU probe packet is transmitted with padding to meet a packet length according to a selected MTU and allowing the path MTU probe packet to be fragmented if the packet is too large. A path MTU probe trailer packet is transmitted having a packet length significantly smaller than the selected MTU. A path MTU received probe packet is then determined to be received. The selected MTU is adjusted up upon determining an Internet protocol (IP) datagram length of the received path MTU received probe packet is the same as the selected MTU defined in the path MTU probe packet, wherein a subsequent MTU discovery probe utilizes the adjusted MTU.

Another embodiment addresses a method in a network node to dynamically adjust a maximum transmission unit (MTU). A path MTU probe packet is transmitted with padding to meet a packet length specified by a selected MTU and allowing the path MTU probe packet to be fragmented if the packet is too large. A path MTU probe trailer packet is transmitted having a packet length significantly smaller than the selected MTU. Upon receiving a path MTU received probe packet having an Internet protocol (IP) datagram length the same as the selected MTU defined in the path MTU probe packet, the selected MTU is adjusted up for a subsequent MTU discovery probe of the adjusted MTU.

Another embodiment addresses a method in a network node to dynamically adjust a maximum transmission unit (MTU). A path MTU probe packet is transmitted with padding to meet a packet length specified by a selected MTU and allowing the path MTU probe packet to be fragmented if the packet is too large. A path MTU probe trailer packet is transmitted having a packet length significantly smaller than the selected MTU. Upon receiving a reply timeout indicating a response to the path MTU probe packets has not been received and with a retry count that is less than N, the path MTU probe packet is retransmitted with the selected MTU, the path MTU probe trailer packet is retransmitted, and the retry count is updated to indicate an additional retransmission has been attempted Another embodiment addresses a computer readable non-transitory medium storing a computer program which causes a computer system to perform a method in a network node to dynamically adjust a maximum transmission unit (MTU). A path MTU probe packet is transmitted with padding to meet a packet length specified by a selected MTU and allowing the path MTU probe packet to be fragmented if the packet is too large. A path MTU probe trailer packet is transmitted having a packet length significantly smaller than the selected MTU. Upon receiving a path MTU received probe packet having an Internet protocol (IP) datagram length the same as the selected MTU, the selected MTU is adjusted up for a subsequent probe of the adjusted MTU.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
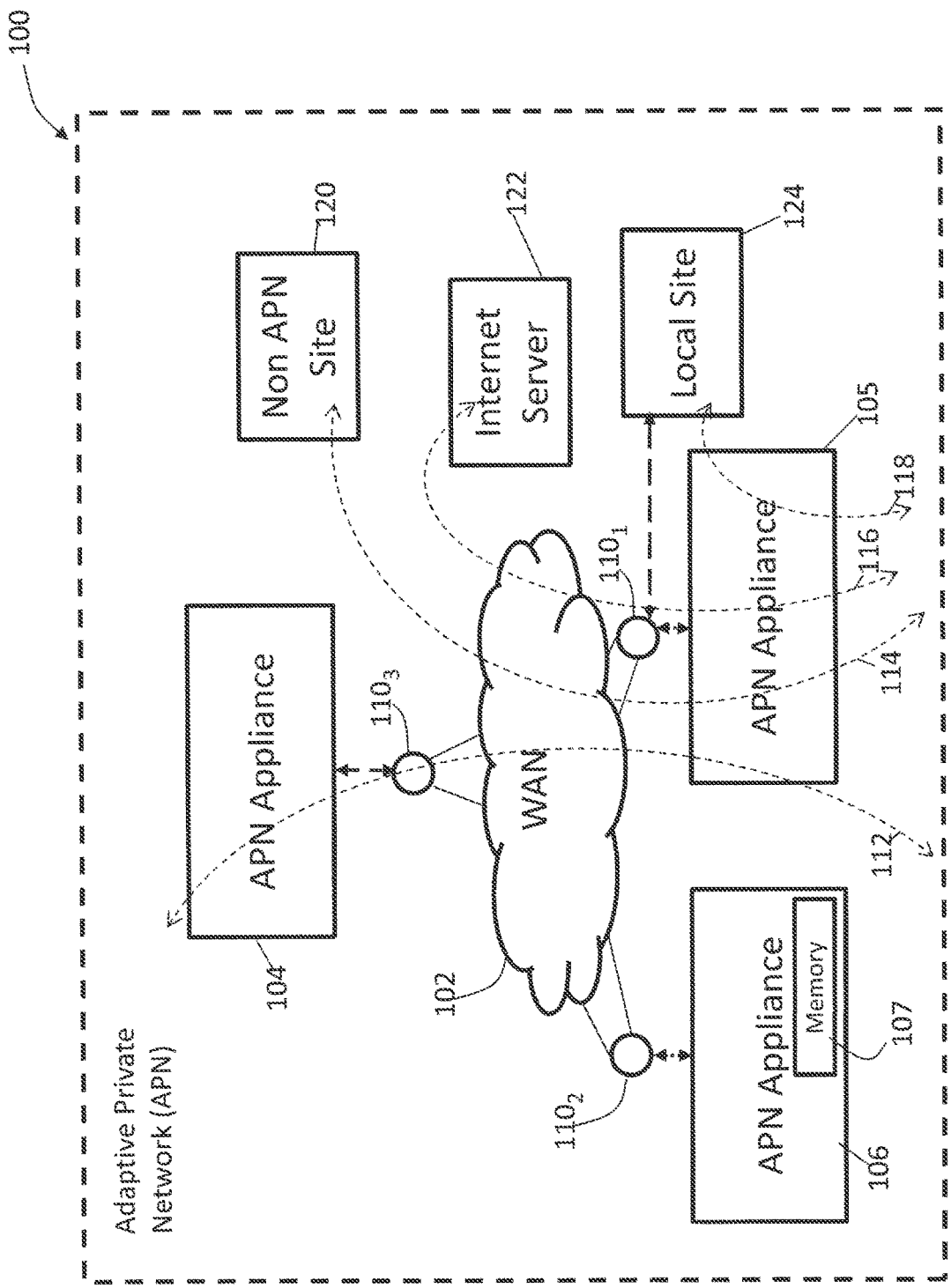
FIG. 1 illustrates an adaptive private network (APN) with APN network service paths in accordance with the present invention.

FIG. 1 shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers $110_1$-$110_3$, and network application services as well as APN conduits between APN appliances, as described in more detail below.

An APN path is a logical connection established between two WAN links located at different geographic sites across a WAN.

An APN conduit is a virtual connection between two APN nodes, formed by aggregating one or more APN paths and their allocated WAN link resources.

A conduit MTU is a minimum link MTU of the one or more APN paths between a source node and a destination node.

An APN appliance (APNA) is a device that contains APN node functionality including all software modules within.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links APN appliances communicate with WAN links through logical connections, such as the WAN routers $110_1$-$110_3$ of FIG. 1.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

An APN service is a set of processing steps performed on packets that are transmitted through the APN. As illustrated in FIG. 1, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN node may have multiple APN conduits that connect to remote APN nodes. For each APN conduit there exists a separate APN service instance for the APN conduit service type.

An APN conduit service associated with path 112 manages network traffic packets that are transmitted through the APN 100 from the APN appliance 105 through router 110$_1$, through the WAN 102, through another router 110$_3$ to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance 105 and a local site 124 within the same first geographic location. In another embodiment, an APN pass through service may be used to send and receive data between a first geographic location that has the APN appliance 105 and different geographic location within an enterprise network that does not have an APN appliance and does not traverse the WAN using any WAN links associated with any other APN services.

Figure 2:
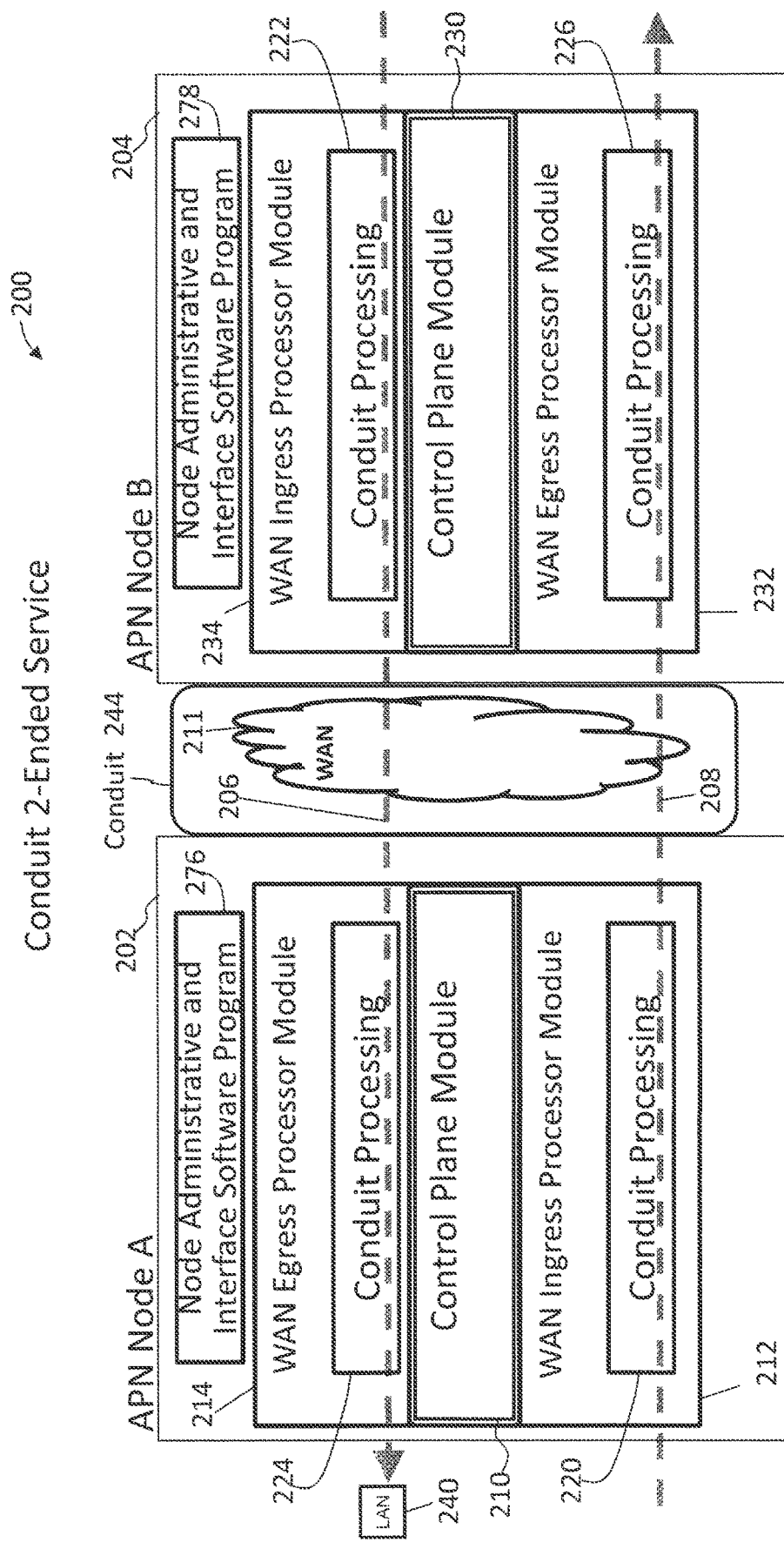
FIG. 2 illustrates an APN conduit service between a control node and a client node in accordance with the present invention.

FIG. 2 illustrates an APN conduit 2-ended service 200 between an APN node A 202 and an APN node B 204 according to the present invention. Each APN node contains a collection of software modules which govern its participation within an APN. The software modules for the APN node A 202 and the APN node B 204 include control plane modules 210 and 230, WAN ingress processor modules 212 and 234, WAN egress processor modules 214 and 232, and node administrative and interface software program modules 276 and 278, respectively. As illustrated in FIG. 2, the WAN ingress processor modules 212 and 234 includes conduit services 220 and 222, and WAN egress processor modules 214 and 232 includes a duplicate conduit service 224 and 226. Intranet service, Internet service, and pass through service are also provided at each APN node. Each APN service type, including conduit, intranet, Internet, and pass through service types, implements processes for each type of data traffic that is communicated to and from the WAN respectively.

As illustrated in FIG. 2, APN conduit traffic, identified by bold dashed arrow path 206 and 208, flows through two APN nodes 202 and 204 as the traffic traverses the APN. WAN ingress processing module 234 of APN client performs the WAN ingress conduit service processing 222 prior to transmitting the traffic 206 via the WAN 211 to the APN node A 202. WAN egress processor module 214 of the APN node A 202 performs the WAN egress conduit service processing 224 prior to transmitting the traffic 206 to the node or nodes located on LAN 240. The binding of the one APN node's WAN ingress conduit processing 222 to the peer APN node's WAN egress conduit service processing 224 constitutes an APN conduit 244 in which traffic is actively monitored and managed across multiple WAN resources.

The APN is capable of using disparate asymmetric WAN links which vary in behavior of bandwidth, latency, jitter, packet loss and congestion frequently over time. For example, the APN can use an asymmetric DSL WAN link that transmits data at 512 kbps upstream to the WAN and 6 mbps from the WAN through the public network combined with a private symmetric leased circuit T1 WAN link that transmits data at 1544 kbps upstream and downstream and a cable broadband connection that transmits data at 312 kbps upstream to the WAN and 3 mbps from the WAN to a peer having adequate aggregation bandwidth of these rates for a single TCP file transfer session at a theoretical transmit rate of 2368 kbps and receive at 10544 kbps. Practically, under good network behavior the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In a presently preferred embodiment, the APN node's software modules at a site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a rack mounted processing device, a personal computer, a server, or the like having one or more central processing unit devices. The processor and memory complex, for example, may be configured to execute instructions under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM) memory, flash memory, ROM memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN node) contains software modules required to participate in an adaptive private network. An APN node may exist in one or more APN appliances at a location. An APN node contains a collection of software modules which govern its participation within an APN such as in FIG. 2 control plane modules 210 and 230, WAN ingress processor modules 212 and 234, and WAN egress processor modules 214 and 232. The control plane module is responsible for controlling and participating in the control of the APN node in tandem with other APN nodes in the network.

The WAN ingress processor module 212 may suitably be embodied as software and hardware components responsible for processing network traffic for transmission from a local area network (LAN) to a WAN. The WAN egress processor module 214 may suitably be embodied as software operating on hardware components, such as a processor and memory complex that is responsible for processing network traffic for transmission from a WAN to a LAN. WAN ingress and WAN egress processor modules are discussed in further detail below. The APN node's control plane module 210 may suitably be embodied as software operating on hardware components, such as a processor and memory complex that utilizes the APN node's WAN ingress processor module 212 and WAN egress processor module 214 as the means for transmitting and receiving APN node to APN node control data across the WAN.

Software packages for an APN are distributed through administrative interfaces, such as downloading software using interfaces 276 and 278 to the APN nodes. After a software update, the APN services on the APN nodes 202 and 204 are then restarted thus bringing the APN software node configuration into synchronization.

Figure 3:
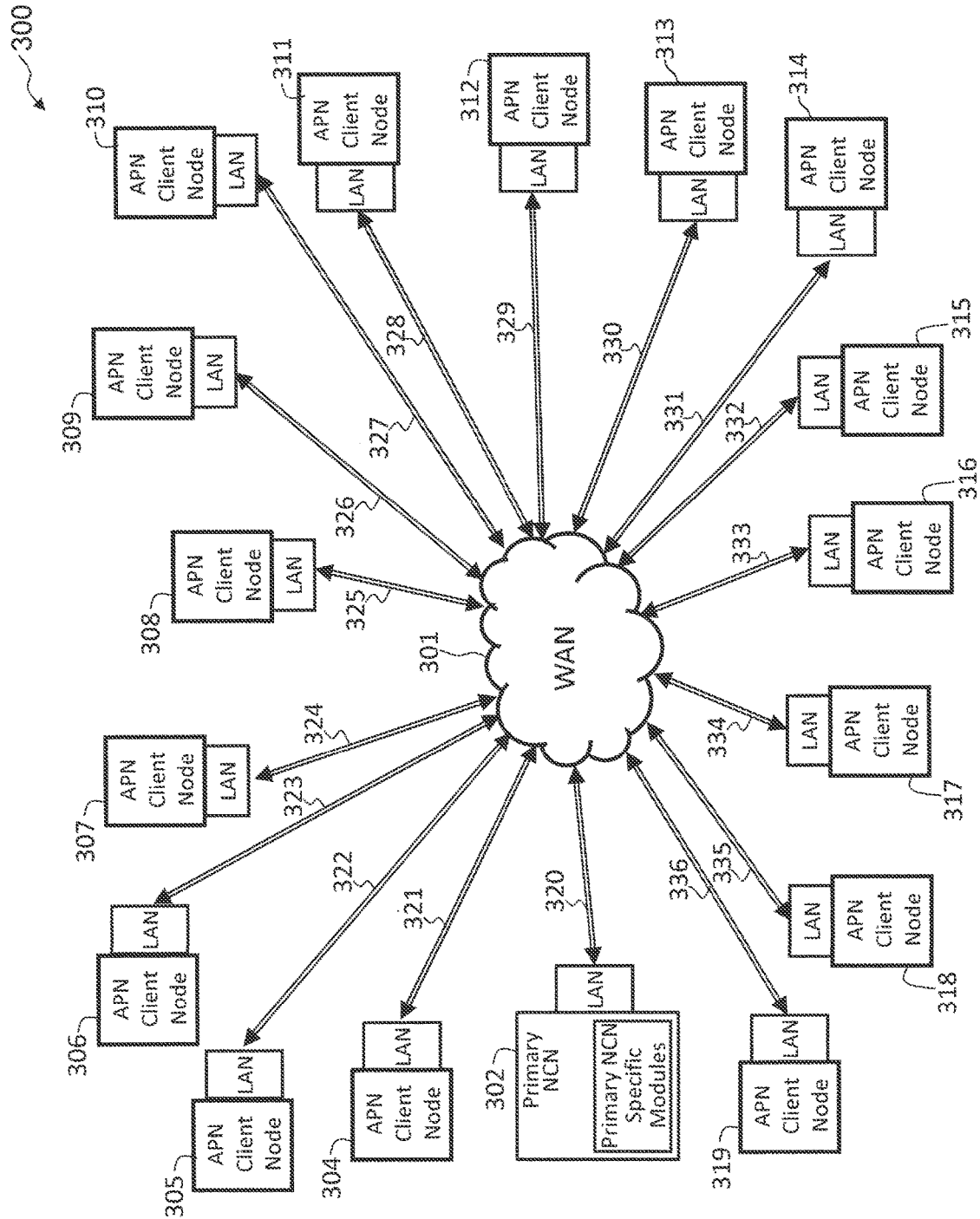
FIG. 3 illustrates an APN having an APN network control node (NCN) coupled through sixteen APN conduits to sixteen APN client nodes according to the present invention.

FIG. 3 illustrates an APN 300 having an APN network control node (NCN) 302 coupled through conduit 320 and through sixteen APN conduits 321-336 to sixteen APN client nodes according to the present invention. As illustrated in FIG. 3, in a presently preferred embodiment, APN 300 is centrally configured. A network administrator configures the entire APN 300 through an APN configuration file that is processed by the NCN 302. The NCN 302 then distributes the configuration settings to all client nodes in the APN 300. This method of configuring the APN 300 is intended to provide benefits to the administrator by providing a single point of configuration to the network. It also assures configuration consistency and compatibility for all APN nodes in the network simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a holistic mapping of the APN resources and their initial allocations. Furthermore, the centralized configuration can provide information and warnings to the administrator as to the behavior of the configuration that may not be obvious or intended from the configuration, before loading the configuration onto a production network.

In one presently preferred embodiment, APN conduits may exist between the NCN and for example sixteen APN client nodes as shown in FIG. 3, for example, although there is no systemic limit to the number of potential APN client nodes. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path. If no path is in path quality good state, then a path with the highest bandwidth path quality bad state is chosen.

FIG. 3 is an exemplary APN 300 with geographically diverse nodes in accordance with the present invention. The exemplary APN 300 is configured with sixteen sites 302-318, which are generally located remotely from each other. A site would be defined as remote if the devices are physically in different locations such as different buildings, cities, states, time zones or countries. For example, a primary NCN site 302 may be located in a company's headquarter location in a first country, a client, such as client 312, may be located in second country, and the other client sites 304-311 and 313-319 may be at some locations intermediate between the two other sites. An APN appliance is a device that contains APN node functionality according to software modules, such as the control plane module 210 and 230, the WAN ingress processor module 212 and 234, and the WAN egress processor module 214 and 232, as described in more detail above with reference to FIG. 2. The sixteen sites 304-319 are coupled by conduits 321-336, respectively, and each of the conduits provides a configurable virtual connection between two connected APN appliances. It is noted that while sixteen client sites 304-319 are illustrated, an APN may support as many client sites as are required for the APN.

Each physical network segment in a network has a maximum packet size associated with it and the network devices attached to that segment know what the maximum packet size is, either by way of a configuration parameter or some physical limitation. When a device needs to forward an IP packet larger than the MTU of that segment, it can send an ICMP packet back and include the MTU of that segment. The networks operate most efficiently if they do not have to fragment and reassemble packets. For efficient network operation, the entry points in the network create the largest packets that can be transported that do not require fragmentation. MTU discovery is about informing the endpoints in the network what the smallest MTU is between the endpoints so that fragmentation can be avoided on the path from a source node to a destination node. When an APN node receives an ICMP packet specifying an MTU, the received MTU specifies the largest conduit packet that can be transmitted by the APN node. The received MTU is not used directly but is adjusted to include the transport reliable protocol (TRP) overhead and for blocking needed for encryption. The adjusted MTU that is selected is the length of the largest user packet that can be sent without having to fragment the packet. For the purposes of the conduit MTU, the APN node examines all the paths of the conduit because the conduit MTU needs to be the smallest of all the path MTUs on the conduit. The conduit MTU allows retransmission of packets on different paths in the conduit without having to fragment the packets.

In one embodiment, a path MTU discovery feature begins a path MTU discovery cycle every K minute interval, where K is a selectable value usually between 1 and 30 minutes, such as setting K equal to ten minutes. A value of K=0 indicates the path MTU discovery feature is turned off. During each discovery cycle, which results in one MTU discovery instance, the WAN ingress starts the discovery cycle by sending a configured MTU on each send path associated with the WAN ingress node using a path MTU probing network protocol. The MTU probing network protocol begins with sending a path MTU probe packet having the size indicated by the configured MTU followed by a path MTU probe trailer packet that is a short packet, much less than the configured MTU indicates. The configured MTU is set in the configuration process for the network as described with regard to FIG. 3 above. The system defaults to 1500 bytes, for example, which is the maximum MTU for an Ethernet segment. Many WANs have additional encapsulation layers, which may require the customer to manually configure the MTU to a lower value. Multiple path MTU probes and path MTU probe trailer packets may be sent during a discovery cycle until a largest MTU that can get through to the other side is discovered.

If a customer want to turn off the path MTU discovery feature, the customer would change the path MTU discovery interval K in minutes to 0 in an adaptive private network (APN) user variable file and cause a variable load instruction to load the interval K=0 in an interval K timer to turn the feature off. One reason for disabling the path MTU discovery feature, for example, is that a WAN link with small MTU sizes, such as wireless links or satellite links, may reduce the MTU size for the conduit to a generally unacceptable minimum size. Some networks set the MTU size to a low value, such as 512 bytes. Generally, such a value is too small and it is better to not use that path than to try to use that path and set the conduit MTU to 512 bytes. Such WAN links are unusual, but there are enough of them in use to warrant having a way to account for them, such as disabling the path MTU discovery process.

The path MTU discovery feature uses a network protocol having four types of packets which are also referred to as messages. Two of the packets are request packet types and include a path MTU probe request and a path MTU probe trailer request. The other two types of packets are reply message types and include a path MTU received probe packet and a path MTU received trailer only packet. FIGS. 4A-4D illustrate path MTU discovery operations using a selection of the four types of packets.

Figure 4A:
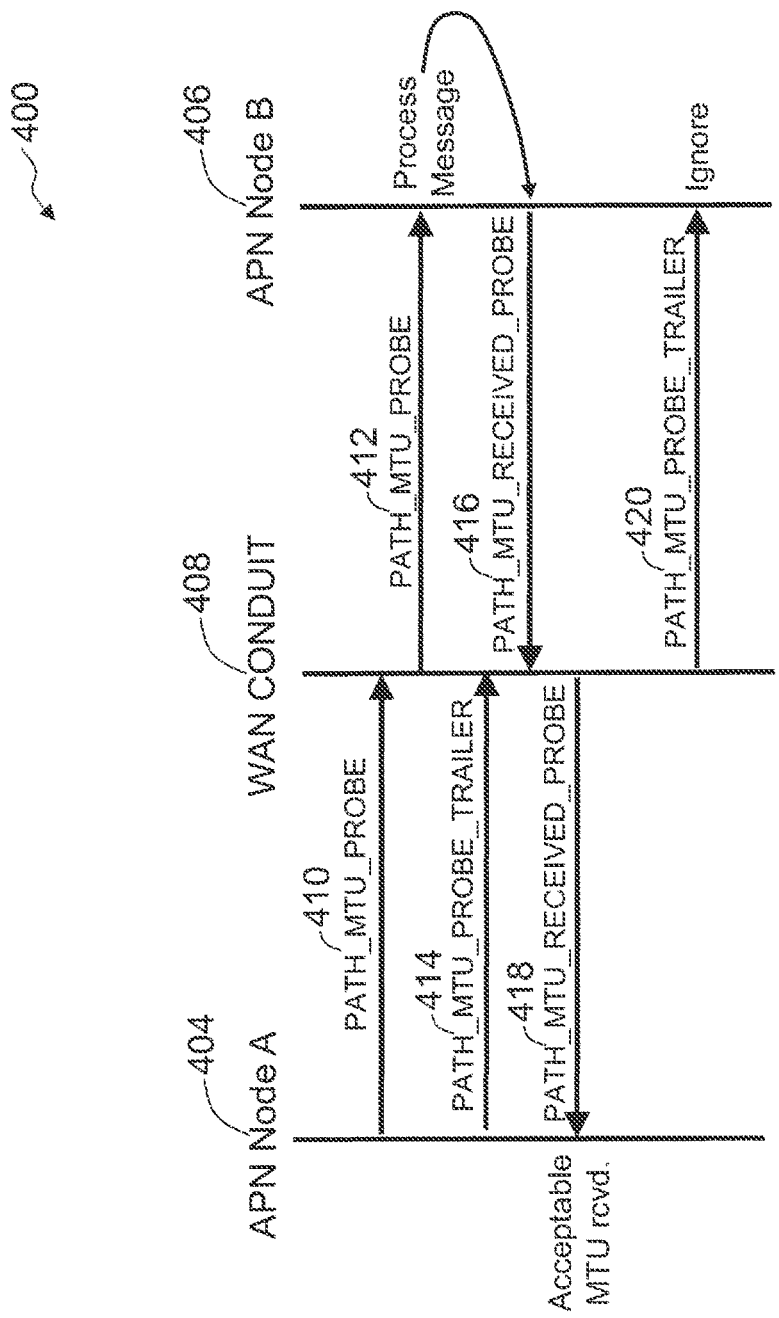
FIG. 4A illustrates a successful MTU probe flow in accordance with the present invention.

FIG. 4A illustrates a successful MTU probe flow 400 in accordance with the present invention. FIG. 4A illustrates an APN node A 404, an APN node B 406, and a WAN conduit 408 connecting the two nodes. The APN node A 404 has a WAN ingress processor, such as the WAN ingress processor module 212, and a WAN egress processor, such as the WAN egress processor module 214. The APN node B 406 has a WAN ingress processor, such as the WAN ingress processor module 234, and a WAN egress processor, such as the WAN egress processor module 232. The processing of the path MTU packets is accomplished within a control plane module, such as the control plane module 210. Paths are unidirectional so they have a sender, WAN ingress side, and a receiver, WAN egress side. References to "the path" refers to a path being probed for discovery of the MTU and does not refer to the path that response packets are taking through the network. The processing of the path MTU packets occurs in the control plane on the WAN ingress side of the path and the control plane on the WAN egress side of the path. This is advantageous because, the WAN ingress processor generally has no way to receive packets such as the path MTU received probe because it does not receive packets from the WAN.

The path MTU discovery feature begins with the control plane on the WAN ingress side of the path in APN node A sending a path MTU probe request packet 410 to the WAN conduit 408. The path MTU probe request packet 410 is a size as specified by the MTU contained in the path MTU probe request packet 410. After traveling through the conduit, a path MTU probe request packet 412 leaves the WAN conduit 408 to be received by the control plane on the WAN egress side of the path in APN node B 406. The control plane on the WAN ingress side of the path in APN node A sends to the WAN conduit 408 a path MTU probe trailer 414 having a small size less than the MTU. The path MTU probe trailer 414 would have a size smaller than the minimally acceptable MTU. For example, if the MTU is never to be smaller than 512 bytes, then the MTU probe trailer would be set to be smaller than 512 bytes. The path MTU probe request packet 412 is processed in the APN node B 406, for example in the control plane module 230, and a path MTU received probe packet 416 is sent by the control plane from the APN node B 406 to the WAN conduit 408. After traveling through the conduit, a path MTU received probe packet 418 leaves the WAN conduit 408 to be received by the control plane in the APN node A 404. The receipt of the path MTU received probe packet 418 indicates the MTU sent with the path MTU probe 410 is acceptable. The path MTU probe trailer 420 that leaves the WAN conduit 408 is received in the APN node B 406 and is ignored since the path MTU probe 412 was previously received.

Advantageously, the path MTU probe request packet 410 is configured with the do not fragment bit set to off. Since the do not fragment bit is off, the path MTU probe request packet 410 may be fragmented if necessary. For example, when the control plane on the WAN egress side of the path in the APN node B 406 receives the first fragment of a fragmented path MTU probe request packet 412, the control plane module 230 writes the received MTU size selected from the fragmented path MTU probe request packet 412 so that it can be compared to the selected MTU, as described in more detail below. The actual IP datagram size of the path MTU probe request packet 412, whether it is fragmented or not, received by node B is written in the path MTU received probe packet 416 being sent back to the APN node A 404. The APN node A 404 upon receipt of the path MTU received probe packet 418 determines, in the control plane module 210 whether the sent MTU was too large and the fragment IP datagram size is used as the next MTU size by the forwarding code, thereby shortening the path MTU discovery process.

The IP datagram length is generally equal to the selected MTU which means that what was sent from a source node was received at a destination node. If the IP datagram length is less than the selected MTU, then the sent probe packet was fragmented. Since the probe packet is fragmented, the IP datagram length is within a threshold range of an optimum setting for the path.

Figure 4B:
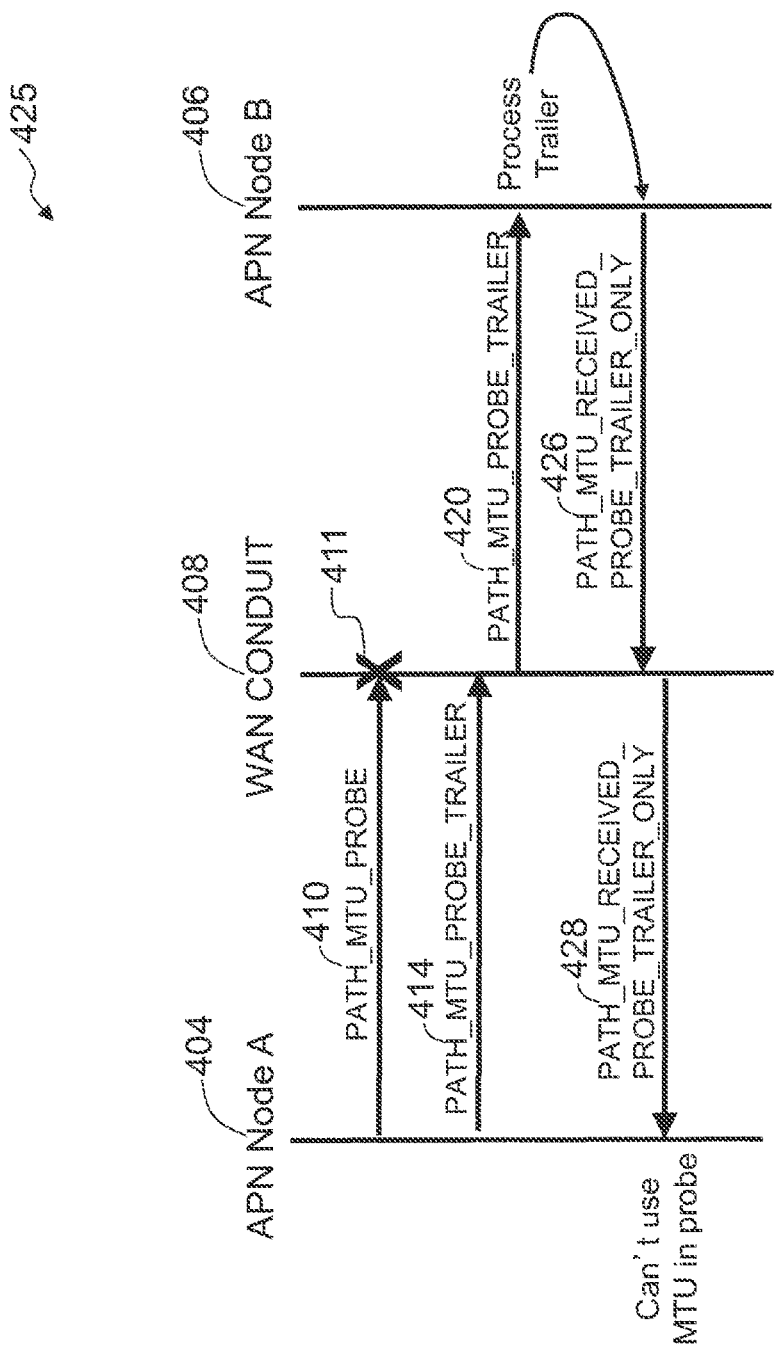
FIG. 4B illustrates for WAN egress, a reception flow for a path MTU probe trailer only packet in accordance with the present invention.

FIG. 4B illustrates for WAN egress only a reception flow 425 for a path MTU probe trailer only packet in accordance with the present invention. Most network equipment fragment packets that are too large, but that is not guaranteed. Some network equipment may drop packets that are too large. Such a situation is illustrated by the reception flow 425 of FIG. 4B. For example, the MTU probe flow 400 continues with larger MTU values and packets of the specified MTU size until the MTU size is too large compared to the actual MTU. As a consequence of the MTU size being too large, the path MTU probe request packet 410 is not received at the APN node B 406 since it was stopped, shown as a large X 411 in FIG. 4B, someplace within the WAN conduit 408. Even though the path MTU probe request packet 410 was too large, the path MTU probe trailer 414 is small enough to pass through the WAN conduit 408. The path MTU probe trailer 420 leaves the WAN conduit 408 and is received in the WAN egress processor in the APN node B 406. The path MTU probe trailer 420 is processed in the APN node B 406, such as by control plane module 230, and a path MTU received probe trailer only packet 426 is sent by the control plane from the APN node B 406 to the WAN conduit 408. After traveling through the conduit, a path MTU received probe trailer only packet 428 leaves the WAN conduit 408 to be received by the control plane in the APN node A 404. The receipt of the path MTU received probe trailer only packet 428 indicates the MTU sent with the path MTU probe 410 is not acceptable. The selected MTU is adjusted down when the probing side received a path MTU probe trailer only packet which means the destination node did not receive the probe with the selected MTU length.

Figure 4C:
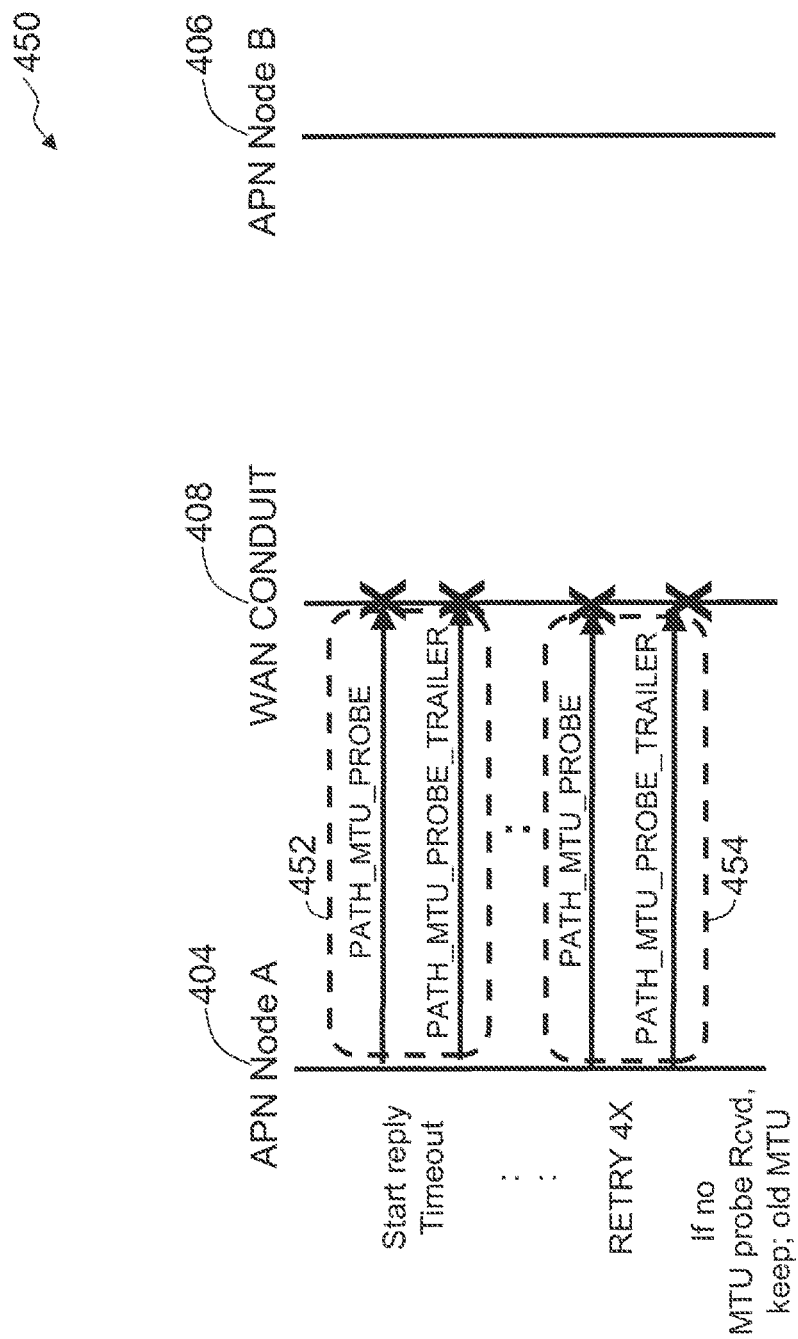
FIG. 4C illustrates conduit operations when probe packets are lost in accordance with the present invention.

FIG. 4C illustrates conduit operations 450 when probe packets are lost in accordance with the present invention. If there are network problems, packets may be lost across the network for reasons unrelated to the MTU size. When the APN node A 404 suspects that a path MTU probe request packet and probe trailer packet were lost because of network connection problems, the control plane on the WAN ingress side of the path sends a path MTU probe request packet followed by a path MTU probe trailer packet sequence N more times, such as N set to four. FIG. 4C illustrates a first sequence of probe packets 452 and a second sequence of probe packets 454. With the first sequence of probe packets 452 a reply timeout counter is started which upon a pre-specified time having elapsed as indicated by the timeout counter, a no reply indication is marked for future use. The reply timeout counter is initialized for each probe cycle, such as setting it to zero, for example. After N reply timeouts, as illustrated scenario of FIG. 4C for N equal to four, all probe packets are considered lost in the WAN conduit 408. Since no path MTU received probe packet was returned, the last known good MTU is maintained. N reply timeouts indicate that there is a different problem than an MTU problem, because even the small trailers could not make it through. From an MTU discovery perspective, no further action is taken because no new information has been discovered. From a network perspective, the control plane would be detecting heavy loss and would stop using those paths for traffic The Path MTU protocol packets are sent in transport reliable protocol (TRP) control packets. One consequence of this is that a loss of path MTU probe packets in the network could cause a path to be considered bad. This is not desirable because it is expected that the path MTU probe packets could be lost, if the MTU is set above the actual MTU. This problem can be prevented by making a change to the TRP protocol. The TRP protocol detects loss by using sequence numbers and detecting gaps in received path sequence numbers. By specifying that the sequence numbers (SNs) do not include the value of zero, SN=zero is allocated as an unused sequence numbers. The TRP protocol then use the number one as an initial sequence number and when the sequence number wraps around, the wrap around skips SN=0 and wraps around to 1. On the WAN egress processor in each APN node, a packet with a sequence number of SN=0 will not be used in determining loss or re-sequencing. With these changes in place, the path MTU probe packets can avoid accidentally making a path bad by transmitting the packets with a path sequence number of 0. Each path has its own set of sequence numbers. A receiver waits for packets to be in sequence before passing them up to the next process level. For example, if a receiver is waiting for a packet with a sequence number "10" but a packet with a sequence number of "11" comes in, the receiver will hold on to the "11" packet until the "10" packet is received. In operation, the "10" packet is either retransmitted or considered lost, then the receiver passes the "11" packet to the next process level. Since path MTU probe packets use a sequence number of SN=zero, in effect having no sequence number, the receiver does not wait to order a received path MTU probe packet. If the probe packet was lost or delayed, the receiver doesn't keep track of it. However, the path MTU probe trailer packets use the next path sequence number for that path.

Figure 4D:
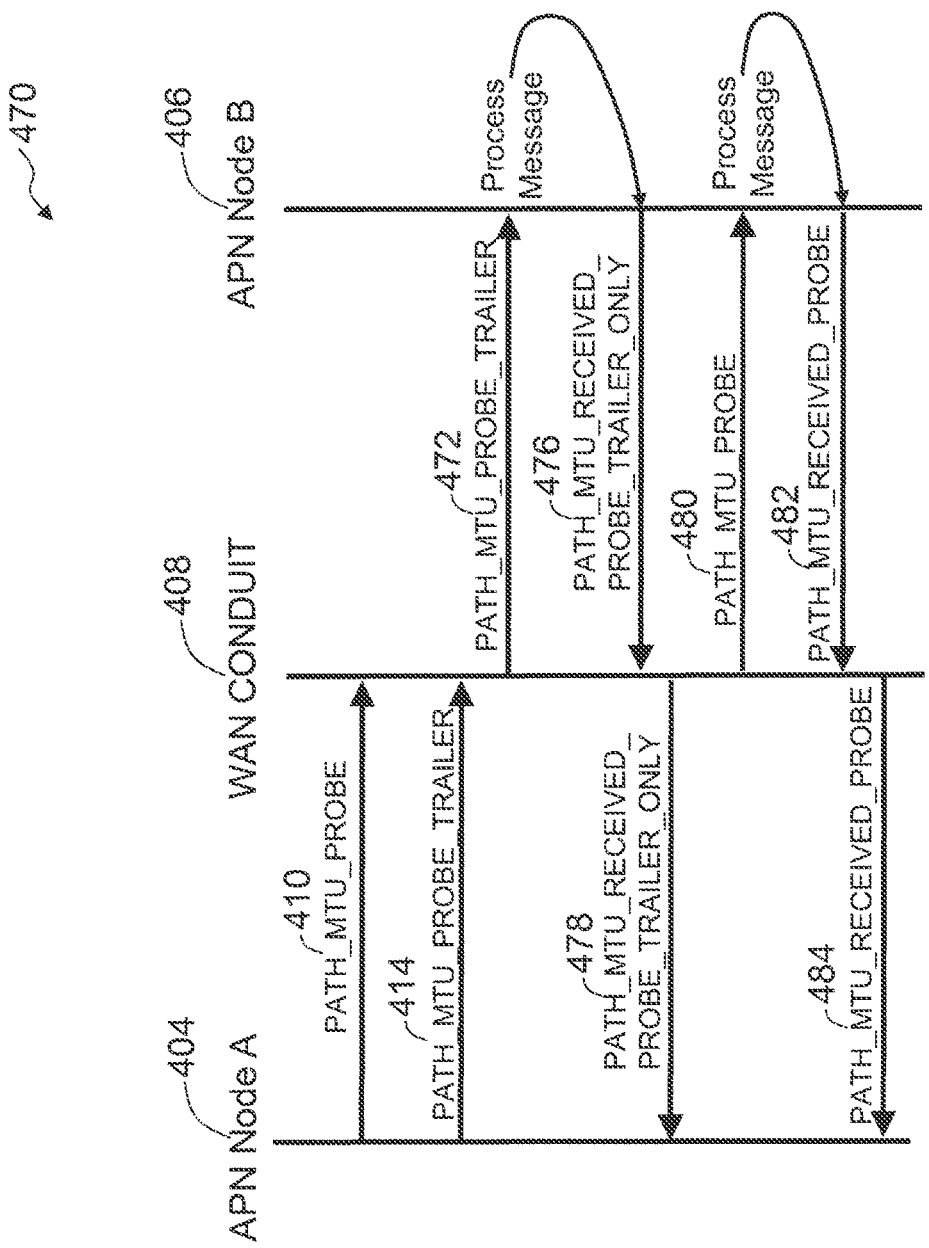
FIG. 4D illustrates a probe trailer received out of order flow in accordance with the present invention.

FIG. 4D illustrates a probe trailer received out of order flow 470 in accordance with the present invention. It is possible for a path MTU probe and a path MTU probe trailer packets to be received out of order as the WAN does not guarantee that all packets are received in the order sent. Also, TRP packets are kept in order by the path sequence number described above. A problem may occur because path MTU probe packets have the path sequence number set to zero, so that if a probe packet is lost, the path is not considered to be bad due to such loss. Generally, the sequence numbers allow packets lost on a path to be retransmitted. The path MTU packets except for the path MTU probe packet are retransmitted by the conduit if considered lost. This is advantageous because the path MTU discovery process is able to operate with moderate packet loss without hitting lots of timeouts and thus improves the speed of the discovery process. Excessive packet loss would cause timeouts because the retransmitted packets could be lost as well as the retransmit of the retransmitted packets.

Regarding FIG. 4D, the APN node A 404 sends the path MTU probe packet 410 followed by the path MTU probe trailer packet 414. When APN node B 406 sees the path MTU probe trailer packet 472 first, the control plane module 230 responds with sending a path MTU received probe trailer only packet 476 from APN node B 406. When APN node B 406 receives path MTU probe packet 480 next, the control plane module 230 responds with sending a path MTU received probe packet 482 from APN node B 406. The APN node B 406 does not know whether the path MTU probe packet 480 was a retransmission as shown in FIG. 4C that made it through the network or an out of order situation. It does not matter in either case as the state machine in the APN node B 406 handles each situation in the same manner In this situation, the APN node A 404 initially receives a path MTU receive probe trailer only packet 478 and transitions to a state associated with the path MTU probe was dropped by the network and then triggers a retransmission of the path MTU probe, not shown in FIG. 4D since it will be ignored when received by the APN node B 406. The APN node A 404 WAN receives the path MTU received probe 484 that is a response to the first path MTU probe packet 480. The control plane module 210 would incorrectly assume that this is a response to the second path MTU probe packet. However, the APN node A 404 only needs to know whether a packet of that MTU size could make it through the WAN conduit 408 which was determined upon receipt of the path MTU received probe 484. The reception of a subsequent path MTU receive probe due to the second path MTU probe is not a problem and it is ignored since the control plane module 210 will have moved on to probing a different MTU.

Figure 5A:
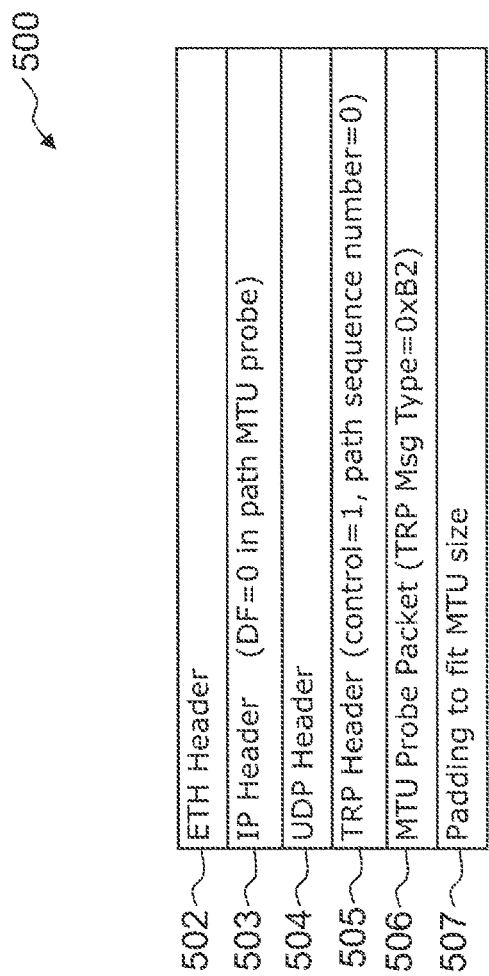
FIG. 5A illustrates an exemplary transport reliable protocol (TRP) control packet formatted for MTU messages in accordance with the present invention.

FIG. 5A illustrates an exemplary TRP control packet 500 formatted for MTU packets in accordance with the present invention. The TRP control packet 500 contains a Ethernet (ETH) header 502, an Internet Protocol (IP) header 503, a user datagram protocol (UDP) header 504, a transport reliable protocol (TRP) 505, a MTU probe packet 506, and padding to fit MTU size 507. The do not fragment bit is set to zero allowing fragmentation and the path sequence number is set to zero.

Figure 5B:
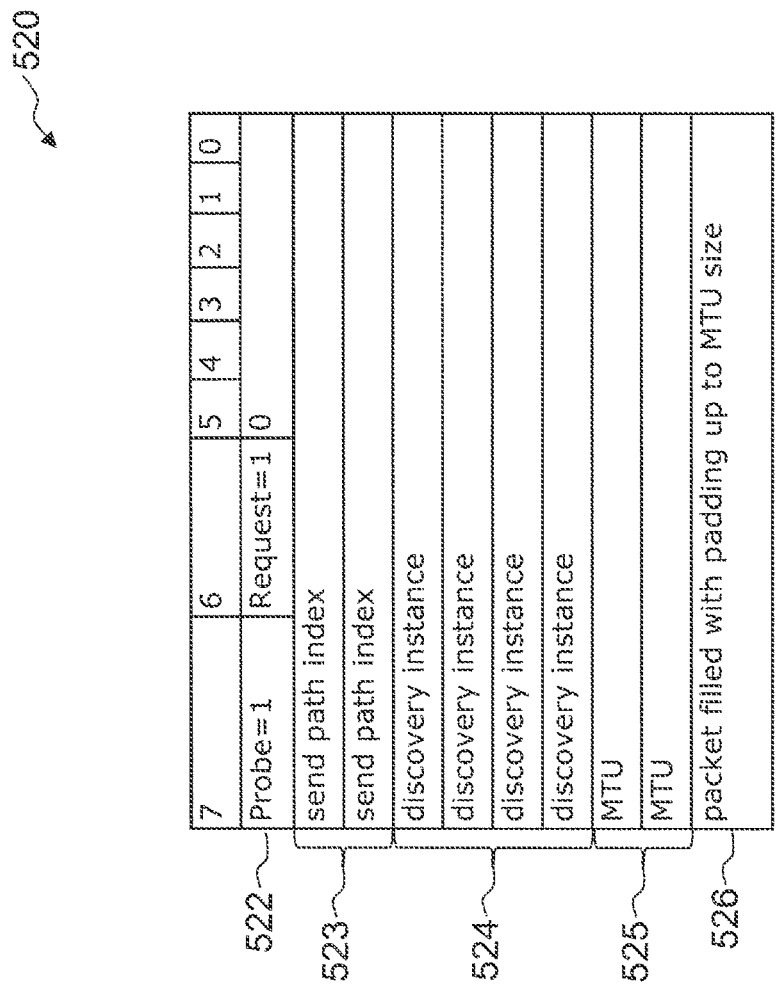
FIG. 5B illustrates an exemplary MTU probe packet in accordance with the present invention.

FIG. 5B illustrates an exemplary MTU probe packet 520 in accordance with the present invention. The MTU probe packet 520 contains a control byte 522 with a probe field in bit 7 set to a one indicating this is a probe packet and not a trailer, a request field in bit 6 set to a one indicating this is a probe request, and a zero in bits 0-5 as a sequence number. The MTU probe packet 520 also contains a 16-bit send path index 523, a 32-bit discovery instance 524, a 16-bit MTU 525, and padding 526 filled up to MTU size. The MTU probe packet 520 corresponds to the path MTU probe packet 410 shown in FIGS. 4A-4D and 412 in FIGS. 4A, 4C, and 4D. The send path index is a unique number that is assigned to each path in the APN. This number is distributed when the network is configured. This makes sure that the control plane can associate the packet to the correct path state machine. The discovery instance is incremented each time the probe not running state 602 is exited due to event 606 as described with regard to FIG. 6 below. The control plane module on the WAN egress side of the path copies the discovery instance value into the responses it sends to the WAN ingress side of the path. The control plane module on the WAN ingress side of the path matches the received discovery instance to the current discovery instance and discards and ignores packets that do not match. This makes sure that an older retransmitted packet from the network does not interfere with the MTU probing process.

Figure 5C:
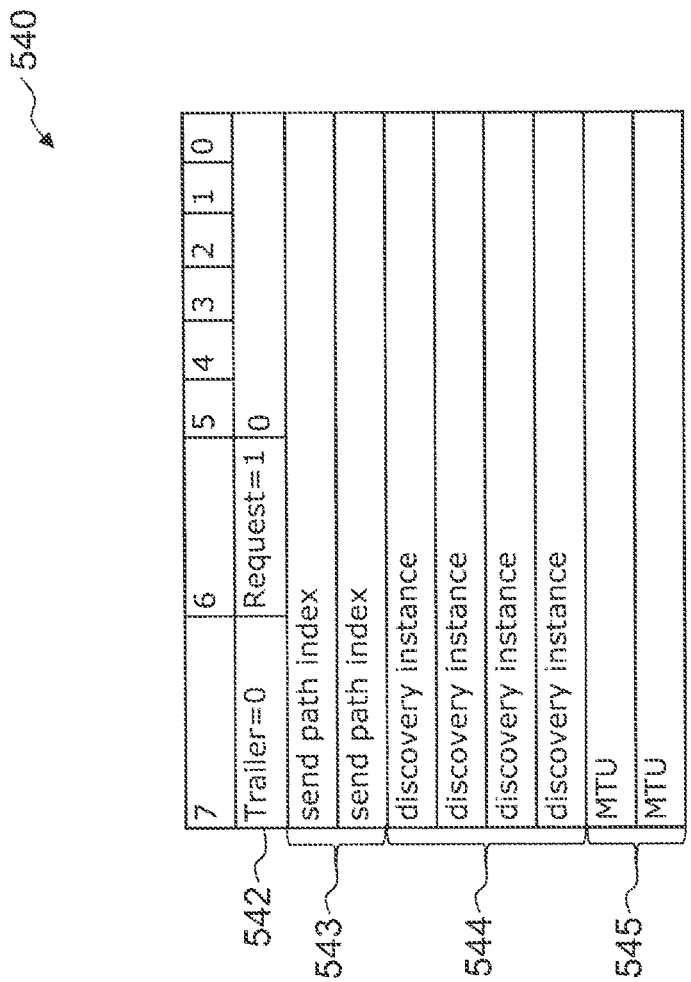
FIG. 5C illustrates an exemplary MTU probe trailer packet in accordance with the present invention.

FIG. 5C illustrates an exemplary MTU probe trailer packet 540 in accordance with the present invention. The MTU probe trailer packet 540 contains a control byte 542 with a probe field in bit 7 set to a zero indicating this is a trailer, a request field in bit 6 set to a one indicating this is a request, and a zero in bits 0-5 as a sequence number. The MTU trailer packet 540 also contains a 16-bit send path index 543, a 32-bit discovery instance 544, and a 16-bit MTU 545. No padding is used in the MTU probe trailer packet 540. The MTU probe trailer packet 540 corresponds to the path MTU probe trailer 414 and 420 of FIGS. 4A and 4B, 414 in FIG. 4C, and 414 and 472 in FIG. 4D.

Figure 5D:
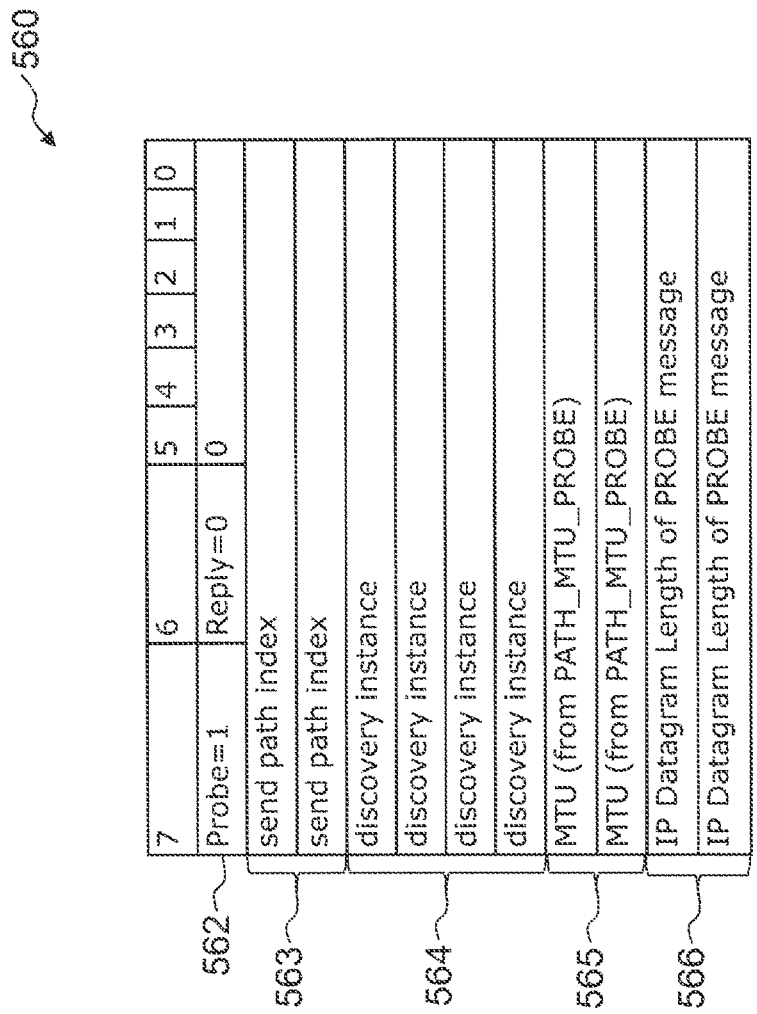
FIG. 5D illustrates an exemplary MTU received probe packet in accordance with the present invention.

FIG. 5D illustrates an exemplary MTU received probe packet 560 in accordance with the present invention. The MTU received probe packet 560 contains a control byte 562 with a probe field in bit 7 set to a one indicating this is a probe packet and not a trailer, a request field in bit 6 set to a zero indicating this is a probe reply, and a zero in bits 0-5 as a sequence number. The MTU received probe packet 560 also contains a 16-bit send path index 563, a 32-bit discovery instance 564, a 16-bit MTU 565 selected from the path MTU probe, and a 16-bit IP datagram length of actual probe packet received 566. The MTU received probe packet 560 corresponds to the path MTU received probe packet 416 and 418 of FIG. 4A and 482 and 484 of FIG. 4D.

Figure 5E:
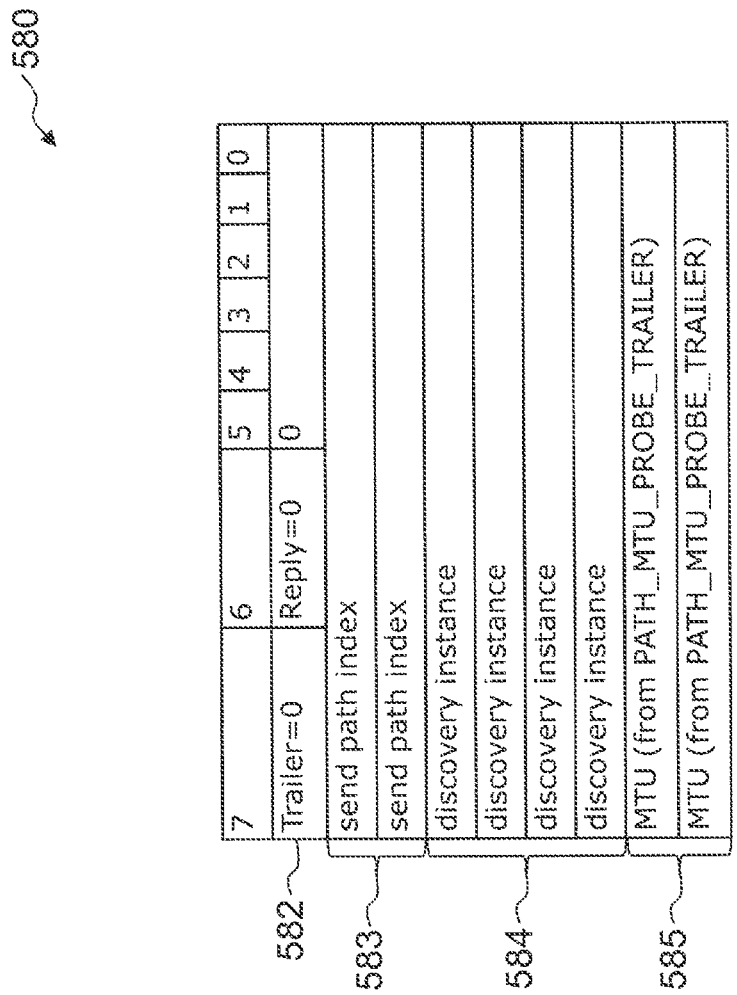
FIG. 5E illustrates an exemplary MTU received trailer only packet in accordance with the present invention.

FIG. 5E illustrates an exemplary MTU received trailer only packet 580 in accordance with the present invention. The MTU received trailer only packet 580 contains a control byte 582 with a probe field in bit 7 set to a zero indicating this is a trailer, a request field in bit 6 set to a zero indicating this is a reply, and a zero in bits 0-5 as a sequence number. The MTU received trailer only packet 580 also contains a 16-bit send path index 583, a 32-bit discovery instance 584, and a 16-bit MTU 585 selected from the path MTU probe trailer. No padding is used in the MTU received trailer only packet 580. The MTU received trailer only packet 580 corresponds to the path MTU received probe trailer only packet 426 and 428 of FIG. 4B and 476 and 478 of FIG. 4D.

Figure 6:
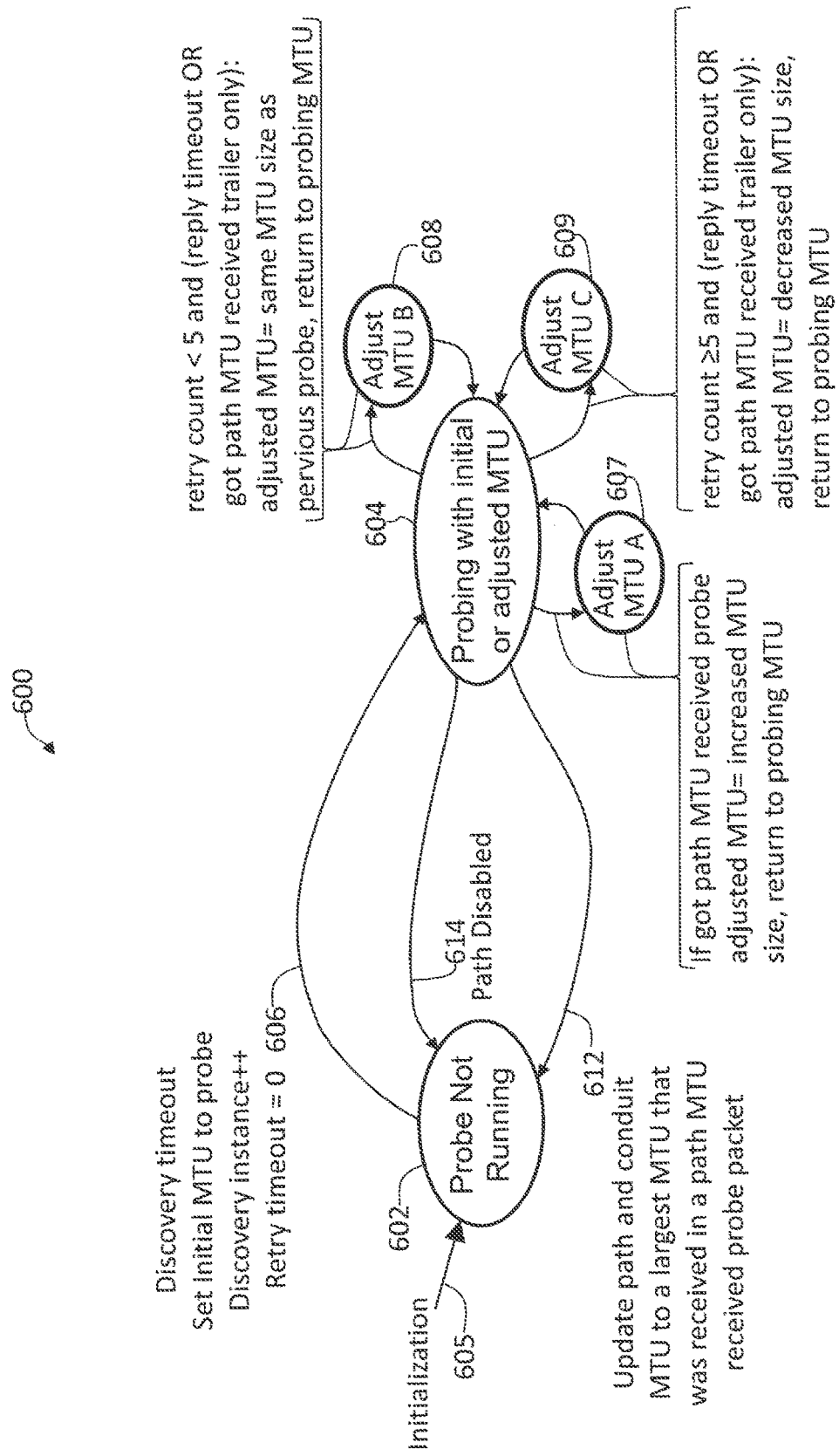
FIG. 6 is a path MTU discovery state machine in accordance with the present invention.

FIG. 6 is a path MTU discovery state machine 600 in accordance with the present invention. The path MTU discovery state machine 600 operates on a WAN ingress side of a path, such as WAN ingress processor modules 212 and 234 at predetermined discover timeout intervals, such as every ten minute interval, to probe a conduit path and communicating nodes to determine the highest MTU that can be used. Due to a system event or events, a currently used MTU may not be optimum. The path MTU discovery state machine 600 and MTU search process 700 described below advantageously select a smaller or a larger MTU to be used in operational transmissions to improve system communication between nodes in the system.

The path MTU discovery state machine 600 is comprised of a probe not running state 602, a probing MTU state 604, a probing MTU sub-state A 607, a probing MTU sub-state B 608, and a probing MTU sub-state C 609 and transitions 606, 612, and 614 between states 602 and 604. An initialization event 605 places the path MTU discovery state machine in a probe not running state 602. Initialization events may include power on of the APN node or a restart operation, such as may occur during software updating. Upon a discovery timeout, set for ten minutes for example, an initial MTU value to probe is set and a transition 606 is made to probing MTU state 604 where a first path MTU probe using the initial MTU and first path MTU probe trailer are sent to a communicating node. If a path MTU received probe packet is received (got path MTU received probe) then a transition is made to probing MTU sub-state A 607, an adjusted MTU is set with an increased MTU size, and the state machine transitions back to state 604. A path MTU probe and path MTU probe trailer are sent with the updated adjusted MTU size.

If a reply timeout has occurred or a path MTU received trailer only packet is received and in either case if a retry counter is less than 5, the state machine 600 transitions to probing MTU sub-state B 608. In the sub-state B 608 for the case that the reply timeout occurred, a reply timeout counter is incremented to note the timeout. Also, in the sub-state B 608, the adjusted MTU is set with the same MTU value as used in the previous probe and the state machine transitions back to state 604. A path MTU probe and path MTU probe trailer are sent with the same MTU size as a previous MTU discovery instance. This aids in distinguishing random packet loss from packet discards due to an MTU that is too large.

If a reply timeout has occurred or a path MTU received trailer only packet is received and in either case if the retry counter is greater than or equal to 5, the state machine 600 transitions to probing MTU sub-state C 609. In the sub-state C 609, since in either case the retry counter is greater than or equal to 5, the MTU is determined to be too large and the adjusted MTU is set with a decreased MTU size and the state machine transitions back to state 604. A path MTU probe and path MTU probe trailer are sent with the updated adjusted MTU size.

In probing MTU state 604, a determination is made whether the search for optimum MTU should end upon receiving indication that the path is disabled taking transition 614 to the probe not running state 602. Also, in the probing MTU state 604 a determination is made whether there are no more MTU values to be searched. If no path MTU received probe packets were received during the search, then the MTU of the path remains unchanged when the system takes transition 612 to the probe not running state 602. In the case where an optimum MTU value has been determined to be within the constraints of the process, as described in more detail with regard to FIG. 7, the system takes transition 612 to the probe not running state 602. The next discovery timeout causes a transition 606 to be taken back to check if any change has occurred that would affect the current MTU value.

The WAN egress processing responds to a path MTU probe packet that is received or a path MTU probe trailer that is received. When a path MTU probe packet is received for a path, the egress path data structure is updated to reflect that a probe with a set MTU was received with a certain discovery instance value. The APN node then sends a path MTU received probe packet to the sender of the path MTU probe packet, over any available path. The IP length in the received path MTU probe is the actual size of the path MTU probe received. This is used in case the original probe was fragmented.

When a path MTU probe trailer is received for a path, the egress path data structure is consulted to determine if a probe for that MTU with that discovery instance has been received. If it has not, then a path MTU received trailer only packet is sent in reply. If the egress path data structure indicates that a path MTU probe packet had been received, then nothing is done with the path MTU probe trailer packet.

Figure 7:
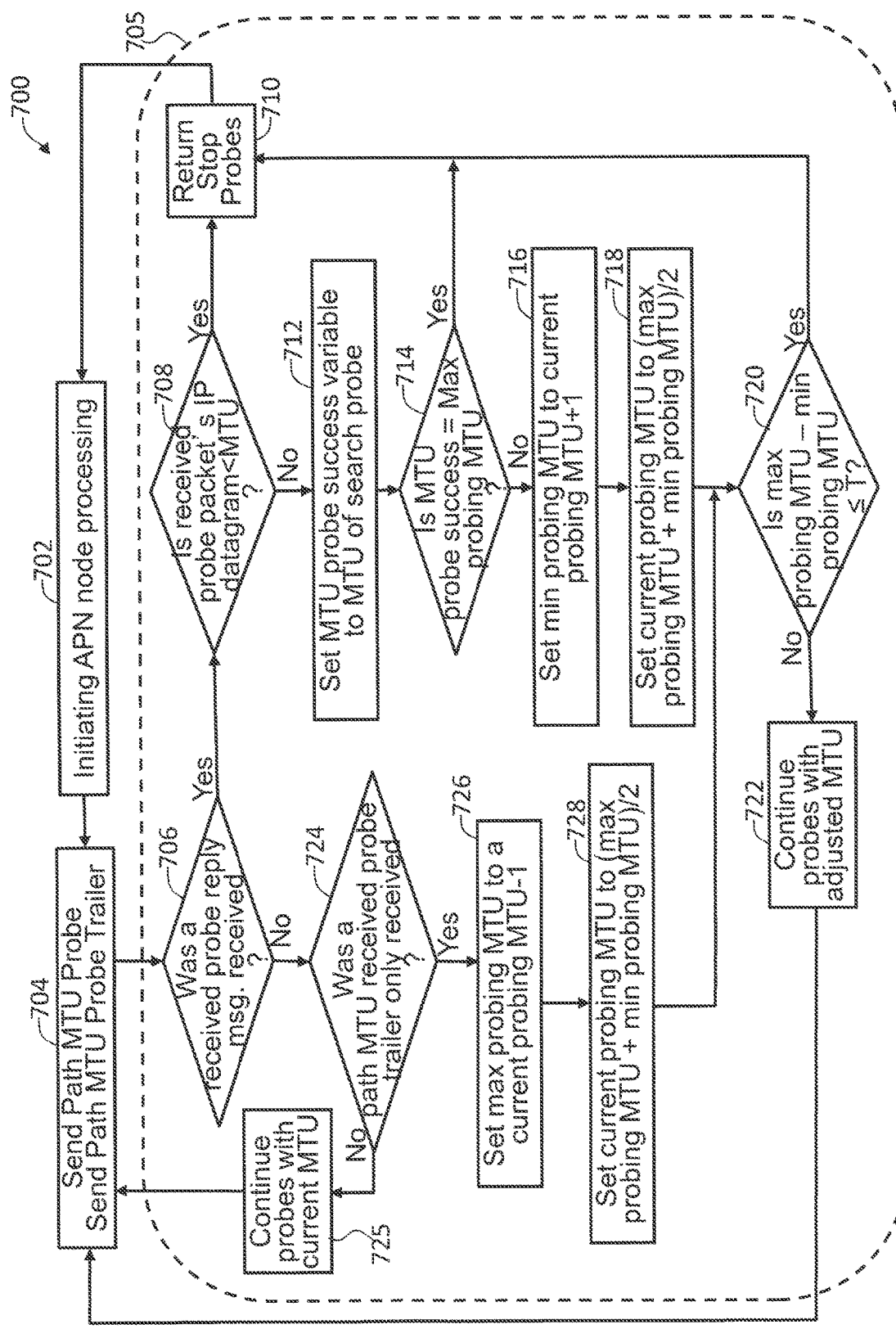
FIG. 7 illustrates an exemplary MTU search process 700 in accordance with the present invention.

FIG. 7 illustrates an exemplary MTU search process 700 in accordance with the present invention. At step 702, a search for optimum MTU process is initiated with a selected initial probing MTU value, a selected initial maximum probing MTU value, and a selected initial minimum probing MTU value. Step 702 may include other processing in support of the path processing such as having a discovery timeout counter that is used to initiate the path MTU discovery process. At step 704, a path MTU probe and path MTU probe trailer are prepared with the initial probing MTU value or an updated adjusted MTU value as described with regard to FIG. 6 and below in more detail. The probe packets are then sent from an initiating node, such as APN node A 404 in FIG. 4A to a communicating node, such as APN node B 406 across a WAN conduit, such as WAN conduit 408. The process 705 represents steps for finding the next MTU size to probe or determining whether probing should be stopped. The path MTU received probe packet and the path MTU received probe trailer only packet are received in the WAN egress processor module 214 and communicated to the control plane module 210 within the receiving APN node A 404. At step 706, a determination is made whether a received probe reply packet or message (msg.), such as the path MTU received probe 418, was received in the initiating node. If a received probe reply packet was received, the process 700 proceeds to step 708. At step 708, a determination is made whether the received probe packet's IP datagram length is less than the MTU sent at step 704. If the received probe packet's IP datagram length is less than the sent MTU, the process 700 proceeds to step 710. Such determination at step 708 indicates fragmentation occurred and the IP datagram length may be used to determine an MTU for future transmissions. From step 710, the process 700 proceeds to step 702 to stop the current search for optimum MTU. Based on the predetermined interval, a new search for optimum MTU is initiated. If the received probe packet's IP datagram length is equal to the send MTU, the process 700 proceeds to step 712.

At step 712, an MTU probe success variable is set to the MTU of the search probe sent from step 704. At step 714, a determination is made whether the MTU probe success value set in step 712 is equal to the max probing MTU. If the MTU probe success value is equal to the max probing MTU, the process 700 proceeds to step 710 and from there to step 702 to stop the current search for optimum MTU. Based on the predetermined interval, a new search for optimum MTU is initiated. If the MTU probe success value is not equal to the max probing MTU, the process 700 proceeds to step 716. At step 716, the min probing MTU value is updated to the current probing MTU value plus 1, to determine if a larger MTU value would be successful. At step 718, for packets without encryption, the current probing MTU value is set to a summed value of the max probing MTU value and the min probing MTU value divided by two, as an approximation to a binary search for the best MTU to be used. For packets with encryption, the current probing MTU is adjusted downward to the next advanced encryption standard block size. In one aspect, this is necessary in the context of the range checking threshold T to make sure the best block size is selected. Alternative search methods may be used in accordance with the present invention to advantageously increase or decrease an MTU that is used in operational transmissions over time as events occur in the communicating system.

At step 720, a determination is made whether the max probing MTU minus the min probing MTU is less than or equal to a variable T. If the max probing MTU minus the min probing MTU is less than or equal to the variable T, the process 700 proceeds to step 710 since the determined MTU is within the tolerance of the system and is close enough to the best MTU that could be determined. The variable T may be set to a different value as system improvements are made where such variations in MTU may be reduced. Advantageously, the use of the variable T is useful in block encryption processes to account for the size of the encryption blocks. Utilizing the T variable ensures that MTU sizes are not searched for that are within the same encryption block size. If the max probing MTU minus the min probing MTU is greater than T, then the process 700 proceeds to step 722 which indicates a return to continue with the search for a best MTU to use in operational transmissions using the adjusted MTU at step 704.

Returning to step 706, if a received probe reply packet was not received, the process 700 proceeds to step 724. At step 724, a determination is made whether a path MTU received probe trailer only packet was received. If a path MTU received probe trailer only packet was not received, the probe packets may have been dropped. At step 725, the process 700 is informed to continue probes with the current MTU and returns to step 704. If the path MTU receive probe trailer only packet was received, the process 700 proceeds to step 726. At step 726, the max probing MTU is updated to a current probing MTU minus 1 to determine if a smaller MTU value would be successful. At step 728, the current probing MTU value is set to a summed value of the max probing MTU value and the min probing MTU value divided by two, as an approximation to a binary search for the best MTU to be used in operational transmissions. Alternative search methods may be used in accordance with the present invention to advantageously increase or decrease an MTU over time as events occur in the communicating system. The process 700 then proceeds to step 720 as described above.

While the present invention has been disclosed in the context of various aspects of presently preferred embodiments, it will be recognized that the invention may be suitably applied to other environments consistent with the claims which follow.

We claim:

1. A method in a network to address a probe trailer received out of order in a process to dynamically adjust a maximum transmission unit (MTU), the method comprising:
   transmitting from a first network node a first path MTU probe packet having a sequence number set to zero and with padding to meet a packet length according to a selected MTU and allowing the first path MTU probe packet to be fragmented if the packet is too large;
   after said first transmitting step, transmitting from the first network node a first path MTU probe trailer only packet having a packet length significantly smaller than the selected MTU;
   at a second network node, receiving the first path MTU probe trailer only packet and transmitting a path MTU received probe trailer only packet to the first network node;
   receiving, at the first network node and from the second network node the path MTU received probe trailer only packet and transitioning to a state associated with the first path MTU probe packet was dropped;
   at the second network node, after receiving the first path MTU probe trailer only packet, receiving the first path MTU probe packet, in response to the sequence number being set to zero, refraining from using the first path MTU probe packet in determining packet loss or retransmission, and transmitting a path MTU received probe trailer only packet to the first network node;
   at the first network node, after receiving the path MTU received probe trailer only packet, receiving from the second network node a path MTU received probe packet and transitioning to the state associated with the first path MTU probe packet was received; and
   at the first network node, determining that an IP datagram size of the path MTU received probe packet is the same as the selected MTU and less than a maximum probing MTU, and, in response, increasing the MTU and transmitting, from the first network node, a second path MTU probe packet having an IP datagram size equal to the increased MTU.

2. The method of claim 1 further comprising: upon receiving from the second network node the first path MTU probe trailer only packet, adjusting the MTU down from a maximum value; and upon receiving from the second network node the path MTU received probe packet, adjusting the MTU back up to the maximum value.

3. The method of claim 2 further comprising:
   utilizing the maximum value of the MTU during operational communication between the first node to the second node.

4. The method of claim 1 wherein a transport protocol allocates zero as an unused sequence number.

5. The method of claim 1 wherein a retransmission of the first path MTU probe packet is triggered upon receiving the path MTU received probe trailer only packet.

6. The method of claim 5 further comprising:
   ignoring reception of a subsequent path MTU received probe packet.

7. A computer readable non-transitory medium storing a computer program which causes a computer system to perform a method in a network to address a probe trailer received out of order in a process to dynamically adjust a maximum transmission unit (MTU), the method comprising:
   transmitting from a first network node a first path MTU probe packet having a sequence number set to zero and with padding to meet a packet length according to a selected MTU and allowing the first path MTU probe packet to be fragmented if the packet is too large;
   after said first transmitting step, transmitting from the first network node a path MTU probe trailer only packet having a packet length significantly smaller than the selected MTU;
   at a second network node, receiving the path MTU probe trailer only packet and transmitting a path MTU received probe trailer only packet to the first network node;
   at the second network node, after receiving the path MTU probe trailer only packet, receiving the first path MTU probe packet, in response to the sequence number being set to zero, refraining from using the first path MTU probe packet in determining packet loss or retransmission, and transmitting a path MTU received probe trailer only packet to the first network node;
   at the first network node, receiving from the second network node the path MTU received probe trailer only packet and transitioning to a state associated with the first path MTU probe packet was dropped;
   at the first network node, after receiving the path MTU received probe trailer only packet, receiving from the second node a path MTU received probe packet and transitioning to the state associated with the first path MTU probe packet was received; and
   at the first network node, determining that an IP datagram size of the path MTU received probe packet is the same as the selected MTU and less than a maximum probing MTU, and, in response, increasing the MTU and transmitting, from the first network node, a second path MTU probe packet having an IP datagram size equal to the increased MTU.

8. A computer readable non-transitory medium of claim 7 further comprising: upon receiving from the second network node the first path MTU probe trailer only packet, adjusting the MTU down from a maximum value; and upon receiving from the second network node the path MTU received probe packet, adjusting the MTU back up to the maximum value.

9. The computer readable non-transitory medium of claim 8 further comprising:
   utilizing the maximum value of the MTU during operational communication between the first node to the second node.

10. The computer readable non-transitory medium of claim 7 wherein a transport protocol allocates zero as an unused sequence number.

11. A computer readable non-transitory medium of claim 7 wherein a retransmission of the first path MTU probe packet is triggered upon receiving the path MTU received probe trailer only packet.

12. The computer readable non-transitory medium of claim 7 further comprising:
   ignoring reception of a subsequent path MTU received probe packet.

13. A method in a network node to dynamically adjust a maximum transmission unit (MTU), the method comprising:
   transmitting a path MTU probe packet with padding to meet a packet length according to a selected MTU and allowing the path MTU probe packet to be fragmented if the packet is too large;
   subsequent to transmitting the path MTU probe packet, transmitting a path MTU probe trailer packet having a packet length significantly smaller than the selected MTU, the path MTU probe trailer packet having a current multi-bit discovery instance, wherein the current multi-bit discovery instance comprises a value that identifies a current instance of an MTU probing process and that is incremented each time a new instance of the MTU probing process begins;

receiving a path MTU received probe trailer only packet in response to a subsequent MTU discovery probe;

comparing a value of a multi-bit discovery instance field for said received path MTU received probe trailer only packet with the current multi-bit discovery instance field;

in response to determining that the value of the multi-bit discovery instance field for said received oath MTU received probe trailer only packet matches the current multi-bit discovery instance field, adjusting the MTU down; and in response to determining that the value of the multi-bit discovery instance field for said received oath MTU received probe trailer only packet does not match the current multi-bit discovery instance field, ignoring the received oath MTU received probe trailer only packet.

14. The method of claim 13 further comprising: discarding said received oath MTU received probe trailer only packet if the value of the multi-bit discovery instance field does not match the current multi-bit discovery instance.

15. The method of claim 13 further comprising incrementing the current multi-bit discovery instance each time a probe not running state is exited.

* * * * *